United States Patent [19]

Bianco et al.

[11] Patent Number: 5,365,588
[45] Date of Patent: Nov. 15, 1994

[54] HIGH SPEED ENCRYPTION SYSTEM AND METHOD

[75] Inventors: Mark E. Bianco, Pomona; Gregory L. Mayhew, Fullerton, both of Calif.

[73] Assignee: Hughes Aircraft Company, Los Angeles, Calif.

[21] Appl. No.: 30,687

[22] Filed: Mar. 12, 1993

[51] Int. Cl.5 .............................................. H04L 9/00
[52] U.S. Cl. ...................................... 380/42; 380/49; 380/50
[58] Field of Search ............................. 380/42, 49, 50

[56] References Cited

U.S. PATENT DOCUMENTS

| | | | |
|---|---|---|---|
| 4,202,051 | 5/1980 | Davida et al. | 380/50 |
| 4,663,500 | 5/1987 | Okamoto et al. | 380/50 |
| 4,965,881 | 10/1990 | Dilley | 380/50 |
| 5,048,086 | 9/1991 | Bianco et al. | 380/28 |
| 5,054,067 | 10/1991 | Moroney et al. | 380/50 |
| 5,060,265 | 10/1991 | Finkelstein | 380/50 |
| 5,148,485 | 9/1992 | Dent | 380/50 |
| 5,191,610 | 3/1993 | Hill et al. | 380/50 |
| 5,195,136 | 3/1993 | Hardy et al. | 380/50 |
| 5,208,853 | 5/1993 | Armbruster et al. | 380/50 |

OTHER PUBLICATIONS

"Characterizations of Generators for Modified de Bruijn Sequences," G. L. Mayhew, S. W. Golomb, Advances in Applied Mathematics 13, 454–461 (1992).

"On the Classification of Balanced Binary Sequences of Period $2^n-1$;" S. W. Golomb, IEEE Transactions on Information Theory, vol. 26, No. 6, Nov. 1980.

"A Source of Cryptographically Strong Permutations for Use in Block Ciphers," L. Mittenthal, Proceedings of the 1993 IEEE International Symposium on Information Theory.

*Primary Examiner*—David C. Cain
*Attorney, Agent, or Firm*—W. K. Denson-Low

[57] ABSTRACT

A general purpose, high-speed encryption system and method, based on a linear feedback shift register (LFSR) that provides inputs to one or more mathematically independent nonlinear output functions, resulting in the generation of multiple keystream outputs per clock cycle. Due to the parallel architecture, the system need only operate at a rate of 1/N, where N is the number of output functions. For example, the system can encrypt an 8-bit byte in one-eighth the time required for a conventional bit-oriented stream cipher. Alternatively, with high-speed serial-to-parallel and parallel-to-serial interface converters, the system can encrypt a serial data stream at a rate N times that of the system itself.

49 Claims, 4 Drawing Sheets

HIGH SPEED ENCRYPTION SYSTEM AND METHOD

BACKGROUND OF THE INVENTION

This invention relates to general purpose, high speed encryption algorithms.

The Government requires data protection to ensure national security, and industry requires protection of that information which is vital to its success. Cryptography is the science of protecting this information from eavesdropping and interception. The two principal objectives are secrecy (to prevent unauthorized disclosure) and integrity (to prevent unauthorized modification). A number of commercial products are available to provide this protection; however, they tend to concentrate on low to medium speed file and data encryption. Products that protect high-speed data networks tend to be scarce and expensive. In addition, the mathematics underlying cryptography tends to be so complex that few individuals are capable of developing and mathematically proving the strength of new cryptographic algorithms.

This invention overcomes these problems. First, a system embodying this invention can be implemented in technologies that are much lower in cost compared to conventional high-speed technologies (i.e., CMOS vs. GaAs). Conversely, the current high-speed technologies can be used to achieve data rates previously unattainable.

Second, an encryption algorithm in accordance with this invention is based on the well understood mathematics of linear feedback shift registers and de Bruijn functions. The open literature contains numerous references to both topics, thus providing convenient access to the technical details required to fully design, implement, and use the algorithm. Due to the nonlinear nature of de Bruijn sequences, the resulting encrypted data is very robust against cryptanalytic attack.

The Data Encryption Standard (DES) and RSA cryptoalgorithms are the best known and most widely used products available for comparison. DES and an algorithm in accordance with this invention perform similar functions and can generally be used in the same applications. However, DES is a substitution-permutation cipher, which prevents it from being used in high-speed applications due to the high number of iterations that must be performed on each block of data to be encrypted. The RSA algorithm is based on complex mathematical functions, and is generally implemented in a hardware-based arithmetic logic unit. A large number of clock cycles are still required to compute the necessary functions, again limiting it to only moderate data rates.

The Chaos-based encryption algorithm described in U.S. Pat. No. 5,048,086 requires floating-point numerical operations, which limits its maximum throughput to rates inadequate for high-speed applications.

The algorithm of this invention produces multiple key-stream outputs from a single clock cycle, and can be operated continuously to achieve and sustain a very high throughput.

High-speed encryption systems have been previously designed with multiple, independent encryption devices connected in a parallel fashion. However, they are complex and expensive since entire algorithms were physically replicated a number of times, and each was uniquely keyed and initialized. In addition, extra communication channel bandwidth was required to support remote key replacement and receiver synchronization.

The algorithm of this invention only requires one key and initialization sequence for all n keystream outputs, and only the nonlinear output functions must be replicated.

SUMMARY OF THE INVENTION

A high speed data encryption system in accordance with the invention includes a key shift register having a plurality of cascaded register stages, and means for loading said key register with a cryptographic binary data key sequence. The system further includes a working register, comprising a linear feedback shift register having a plurality of stages including an output register stage and a plurality of intermediate register stages. Means are provided for initializing the working register by loading it with a randomly or pseudorandomly generated binary sequence. Preferably, the working register has W stages, and the key register W-1 stages to accommodate the working register.

The system further includes means for selectively feeding back the output state of the output stage of the working register into selected inputs of the intermediate stages, as determined by the contents of the key register.

N nonlinear output function means are provided for performing N different nonlinear functions on data input to the output function means. The output states of T randomly selected stages of the working register are fed to the inputs for each of the N output function means, the outputs of the N output function means determining respective N keystream bits per clock cycle. In a preferred embodiment, the output functions are determined by non-linear de Bruijn sequences. The working register is clocked by a system clock, wherein with each clock cycle, the working register is advanced one state, and the N sets of T working register stage outputs feed the N output function means.

The system further includes means for performing a logical XOR function on respective input data bits and the outputs of the output function means to produce the encrypted data. This logical means preferably comprises a modulo-2 adder.

The invention further includes a method for high speed encryption of digital data. The method includes the following steps:
providing a cryptographic key;
providing a working register comprising a linear feedback shift register having a plurality of stages including an output stage and a plurality of intermediate stages;
initializing the working register with a randomly or pseudorandomly generated binary sequence;
selectively feeding back the output state of the output stage into selected intermediate stages, as determined by the cryptographic key;
operating on the outputs of N sets of T stages of the working register with N respective nonlinear output functions to provide N output keystreams;
logically operating on the N bits of input data with the N bits of output keystream to provide encrypted data; and
clocking the working register stages at a selected rate, wherein the working register is advanced by one state, and N bits of input data are encrypted during each clock cycle.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

This invention is a general purpose, high-speed encryption algorithm. It is based on a linear feedback shift register (LFSR) that provides inputs to one or more mathematically independent nonlinear output functions, resulting in the generation of multiple keystream outputs per clock cycle. Due to this parallel architecture, the algorithm itself only needs to operate at a rate of 1/N, where N is the number of output functions. The benefits of this approach can be viewed in two ways. In one view, the algorithm can encrypt an 8-bit byte in one-eighth the time required for a conventional bit-oriented stream cipher that must be clocked eight times per byte. For example, a 2 Gbit/sec Gallium Arsenide (GaAs) device can encrypt 8-bit bytes at a rate of 16 Gbit/sec. In the other view, with high-speed serial-to-parallel and parallel-to-serial interface converters, the invention can encrypt a serial data stream at a rate eight times that of the algorithm itself. For example, if N=8, the algorithm can encrypt serial data at a rate of 100 Mbit/sec, even though the algorithm itself is only being clocked at 12.5 Mhz. The benefits become even more significant as N grows larger (i.e., 16 or 32). In either case, the algorithm can be fabricated at lower cost and-/or from lower power technologies than previously possible.

Figure 1:
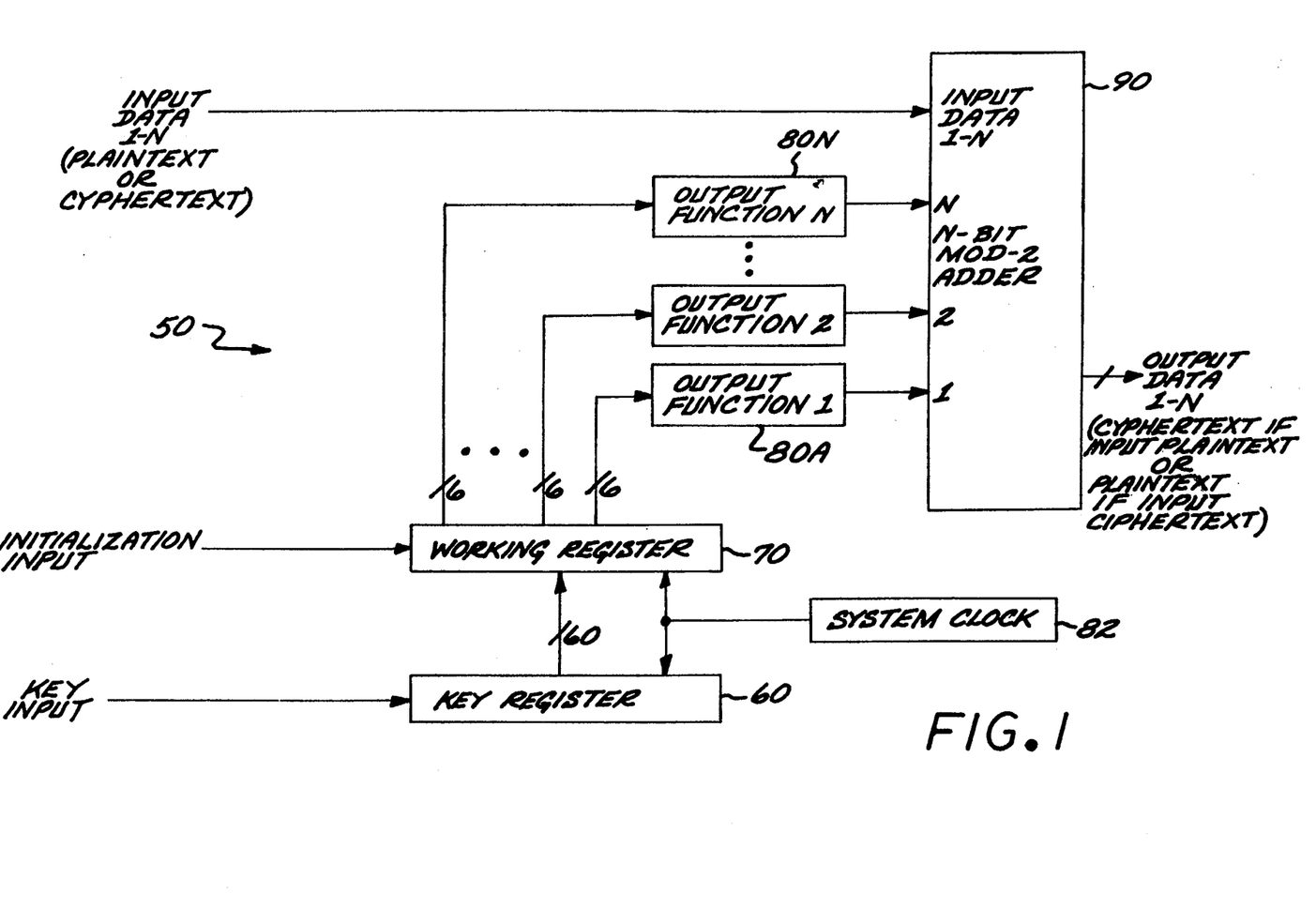
FIG. 1 is a block diagram of a digital system suitable for implementing an algorithm in accordance with this invention.

A block diagram of a digital system 50 for implementing an algorithm according this invention is shown in FIG. 1. The system includes a key register 60 and a working register 70. The key register in this embodiment is a 60-stage simple shift register. The working register in this embodiment is a 61-stage LFSR. In general, the N output functions each have T inputs and one output. The N output functions in this embodiment each have six inputs and one output. Six sets of N randomly selected taps from the working register provide the inputs to mathematically independent nonlinear output functions 80A–80N. Each output function may be implemented as $2^T$ input by one output Read Only Memory (ROM) which stores the truth table for the function or may be implemented as discrete logic which performs the equivalent input to output mapping.

The output of the nonlinear functions represents the keystream that is modulo-2 added (an XOR function) by N-bit modulo-2 adder 90 to the plain text, i.e., the input data, to create ciphertext, i.e., the output data, and vice versa to recover the plaintext from the ciphertext.

Figure 2:
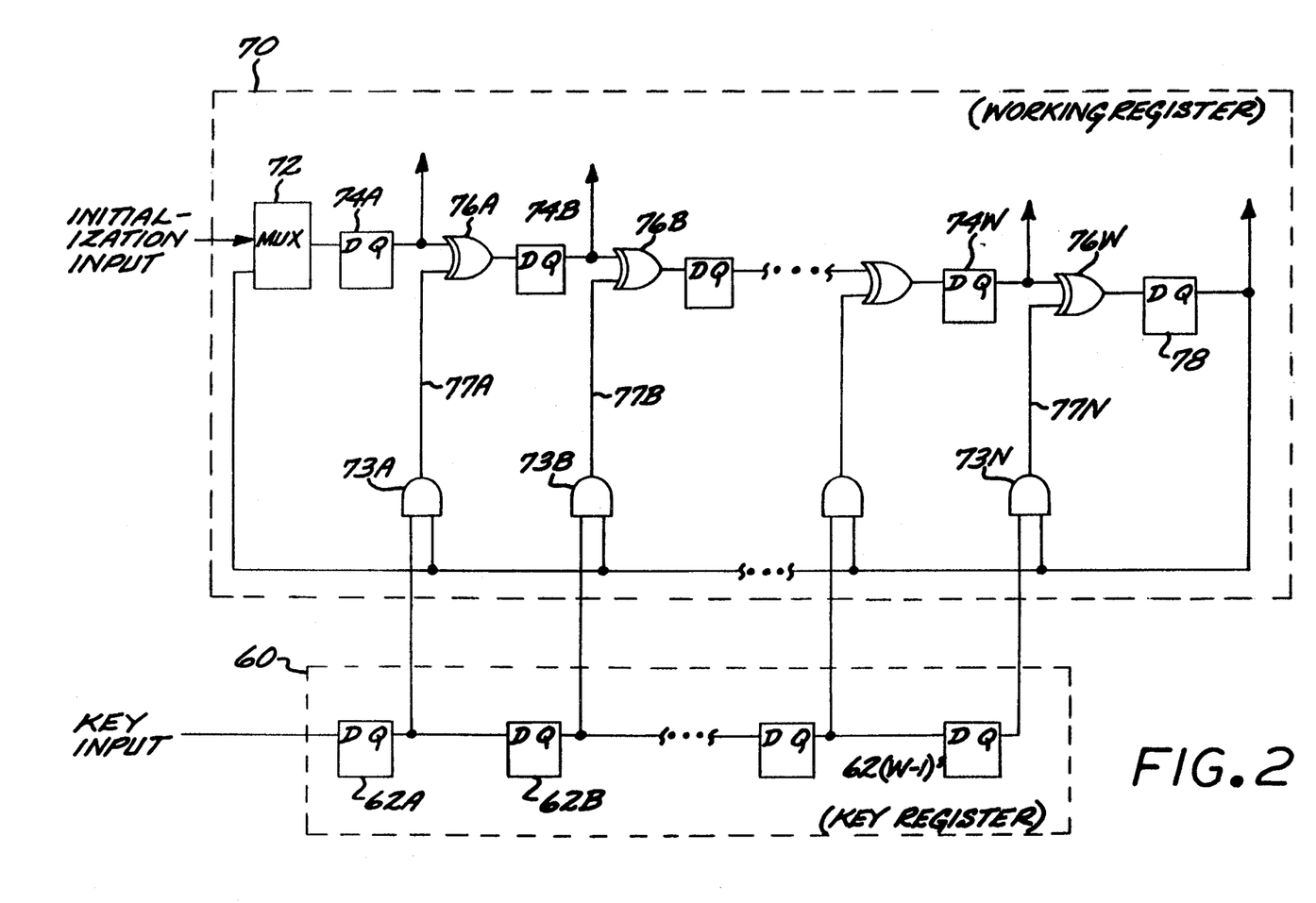
FIG. 2 is a schematic diagram illustrating the key register and the working register of the system of FIG. 1.

FIG. 2 illustrates the key register 60 and working register 70 in further detail. The key register 60 is a shift register comprising a plurality of serially connected registers 62A . . . 62(W-1). Each register 60 and 70 is clocked by the system clock 82 during the initialization mode. Data is transferred from one stage to another in the working register at each clock cycle.

The working register 70 includes a plurality of cells, each comprising a register and XOR gate. One input to the respective XOR gate is provided by the data output of the corresponding register for that cell. The other input to the XOR gate is provided by the output of an AND gate which ANDs the data value of the output register stage 78 of the working register with the data output of a corresponding register device comprising the key register 60. The data output of the output register stage 78 is also fed back to an input of an input multiplexer 72; the other input to the multiplexer 72 is the initialization input. Thus, a first cell of register 70 comprises data register 74A, XOR gate 76A and AND gate 73A. The AND gate output 73A is provided as one input to gate 76A. The other input is the data output of register device 74A. In a particular embodiment, N sets of T data outputs from the register devices 74A through 74W, for a total of N multiplied by T taps, are used as inputs to the N output functions 80A through 80N. Each of the register stages comprising the working register 70 is clocked by the system clock during the encryption and decryption modes.

In operation of the system 50, for both encryption and decryption, a cryptographic key is loaded into the key register 60 and a randomly or pseudorandomly generated binary sequence is loaded into the working register 70. The key register 70 is clocked by the system clock 82 during the initialization mode to load the cryptographic key; during the encryption/decryption mode, the key register 70 is not clocked, but remains in a static condition. The working register 80 is clocked by the system clock during the initialization mode to load the binary sequence, and as well during the encryption/decryption mode. When the system is clocked, the last stage of the working register 70 is selectively fed back into the intermediate stages, as determined by the contents of the key register 60. With each clock cycle, the working register is advanced one state, and the selected taps feed the output functions 80A–80N. With each clock cycle, each nonlinear function produces one keystream bit K. To perform encryption at the encryptor, the N bits of input data, which is considered plaintext PA–PN, are each Exclusive ORed to the corresponding keystream bits KA–KN, thereby yielding N bits of output data, which is considered ciphertext CA–CN, e.g., CA=PA⊕KA. To perform decryption at the decryptor, the N bits of input data, which is considered ciphertext CA–CN, are each Exclusive ORed to the corresponding keystream bits KA–KN, thereby yielding N bits of output data, which is considered plaintext PA–PN, e.g., PA=CA⊕KA. The decryptor is synchronized to the encryptor when the decryptor has the same cryptographic key as the encryptor in its key register and has the same randomly or pseudorandomly generated binary sequence as the encryptor in its working register. When the encryptor and decryptor are synchronized for each message, the keystream produced at the encryptor and decryptor are identical. With identical keystream and the Exclusive OR operator, the decryption process is the inverse of the encryption process such that the appropriate plaintext is easily and rapidly recovered from the supplied ciphertext.

Figure 3:
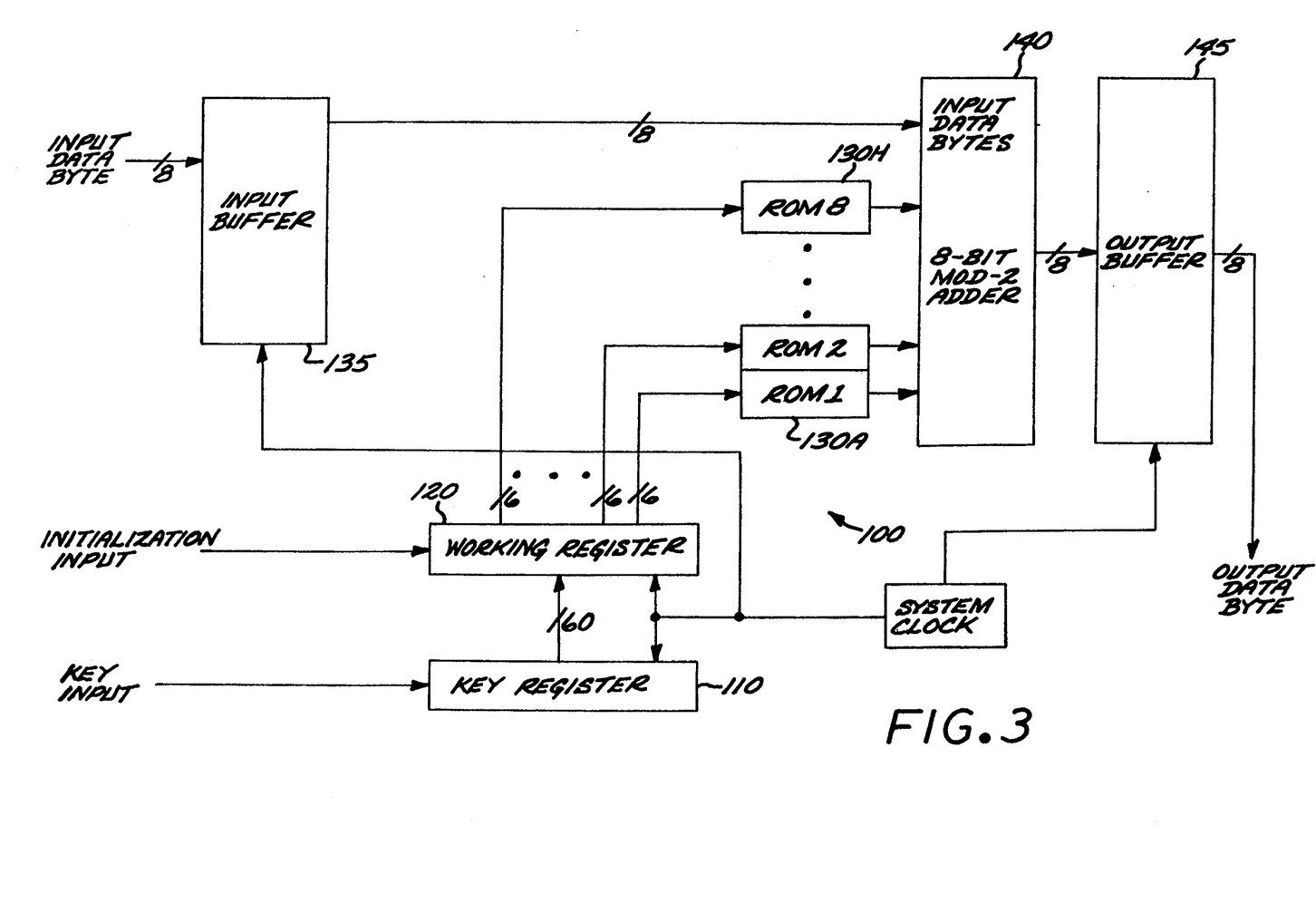
FIG. 3 is a block diagram of an alternate embodiment of the present invention, suitable for high-speed encryption of byte-wide data.

FIG. 3 is a simplified block diagram of a digital system 100 which encrypts 8-bit bytes of data at high speeds. The system includes a key register 110 and a working register 120 as in the system 50 of FIG. 1. Eight ROMs 130A–130H perform the function of the nonlinear output functions. The outputs of the ROMs are fed to the modulo-2 adder 140, and its output is provided to the output buffer 145. An input buffer 135 receives the input data byte to be encrypted.

In operation, the system 100 works as follows. The byte to be encrypted or decrypted is loaded into the input buffer 135. The key register and the working register are initialized in the same manner as described above regarding system 50, by the key input and the initialization input. After initialization, the working register is clocked once, and the encrypted version of the input byte is loaded into the output buffer 145. The ROMs 130A–130H contain nonlinear functions which are used to map the working register tap outputs into their corresponding nonlinear outputs. This process is then repeated until the entire message has been processed.

Figure 4:
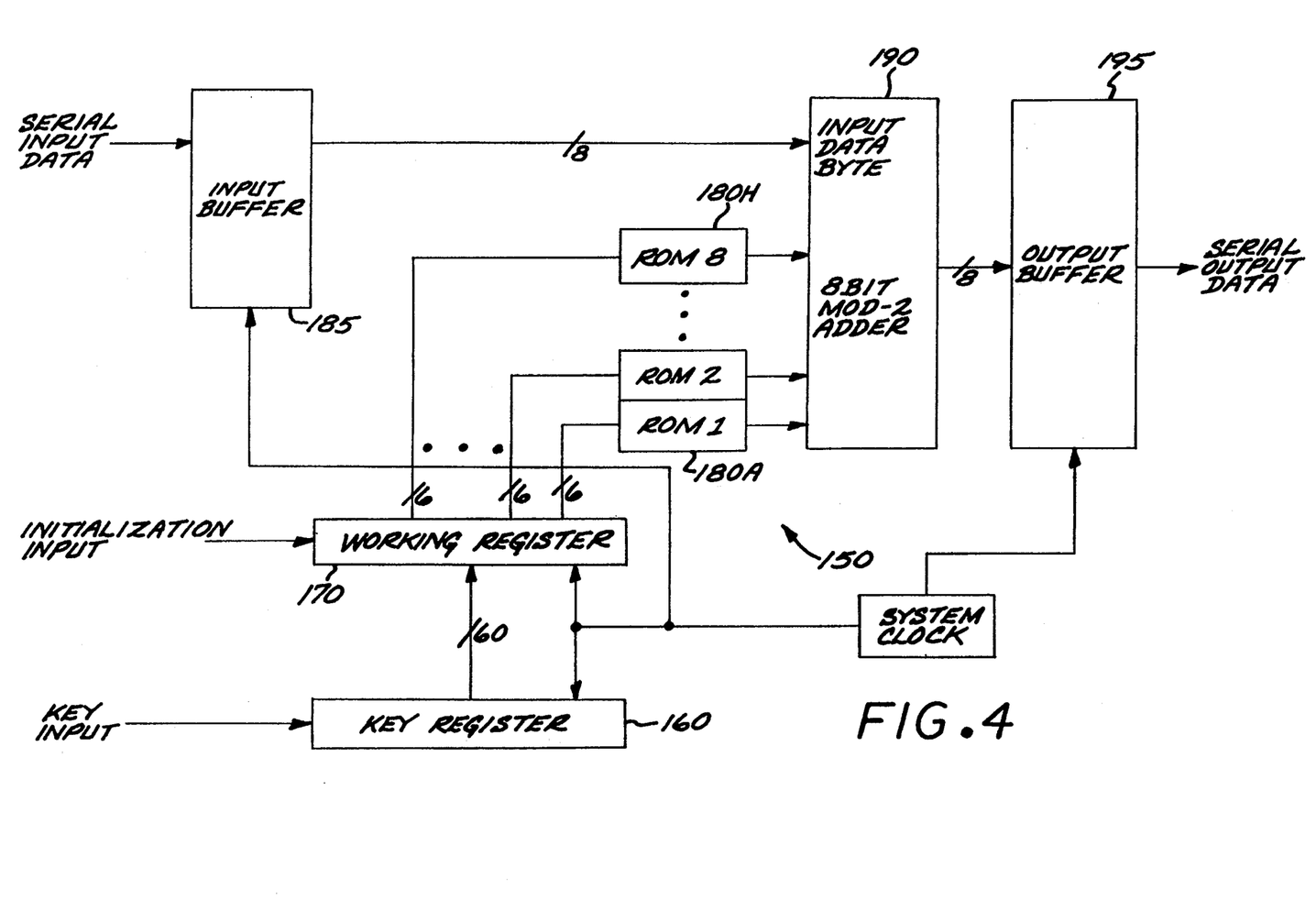
FIG. 4 is a block diagram of an alternate embodiment of a digital system embodying the invention, suitable for high-speed encryption of serial data.

FIG. 4 is a simplified schematic diagram of a digital system 150 in accordance with the invention which encrypts and decrypts serial data. The system includes a key register 160, a working register 170, eight ROMs 180A–180H, input buffer 185, 8-bit modulo-2 adder 190 and output buffer 195.

The system 150 operates in the following manner. The serial input data to be encrypted or decrypted is loaded into the input buffer 185 at a rate 8 times that of the working register, so that the input buffer converts the serial data into a byte or word. The working register 170 is then clocked once at $\frac{1}{8}$ the input rate, and the encrypted or decrypted version of the input byte is loaded into the output buffer 195. The output buffer 195 is then clocked out serially at a rate 8 times that of the working register 170. This process is repeated until the entire message has been processed.

In the foregoing examples of encryption systems 50, 100 and 150 embodying the invention, the working register and key register combine to form a W stage linear feedback shift register. See, Solomon W. Golomb, "Shift Register Sequences," Aegean Park Press, Laguna Hills, Calif., 1982. The keystream produced by this invention has proper cryptographic properties if the key patterns loaded into the key register enable this linear feedback shift register to have a maximal length cycle. A linear feedback shift register has a maximal length cycle if, when operated continuously, the working register would use all $2^W$ states except the all zero state before repeating any state. For the 61 stages in this embodiment, the maximum length cycle is $2^{61}-1$ or approximately $2.31 \cdot 10^{18}$. To obtain a maximum length cycle, the key pattern must be the binary coefficients for a polynomial with degree W that is primitive over a Galois Field of two elements. The literature contains numerous references for selecting or obtaining such polynomials. See, e g., Simon et al , "Spread Spectrum Communications," Volume 1, Appendix 5, Computer Science Press, Rockville, Md., 1985. The number of such polynomials is $\phi(2^W-1)/W$, where $\phi$ is the Euler totient function. See, Niven and Zuckerman, "The Theory of Numbers," Wiley, N.Y., 1980. For the 61 stages in this embodiment, the number of valid key patterns is 37,800,705,069,372,032 or approximately $3.7 \cdot 10^{16}$. Thus, for this embodiment, on the average for all possible key patterns 1 out of every 61 key patterns will produce high quality cryptographic keystream. However, due to the large numbers of available valid key patterns, the keys can be readily generated and replaced as often as desired.

The number of stages W for a particular embodiment is determined by three factors. First, the length of the maximum length cycle should exceed the number of seconds in the desired time usage multiplied by the assumed clock rate. For example, to operate continuously for 365 days at one gigahertz without repeating, the number of cells in the working register must be at least 55. Second, key patterns are easier to determine if the number of stages in the working register is equal to the exponents which produce Mersenne primes. See, Niven and Zuckerman, "The Theory of Numbers, " Wiley, N.Y., 1980. Some examples of exponents producing Mersenne primes are 17, 19, 31, 61, 89, 107, and 127. Third, the number of stages in the working register should be at least half of the number of taps for the output functions, N times T. For example, with 8 output functions and 6 input taps for each function, the working register should have at least 24 stages.

In the foregoing examples of encryption and decryption systems 50, 100, and 150 embodying this invention, the cryptographic quality of the keystream depends on the interaction of the working register with the output functions 80A–80N, 130A–130N, and 180A–180N. The N output functions each have T inputs and one output (order T). The output functions must be nonlinear functions with good randomness properties. A function is nonlinear if terms in the function contain products of any or all input variables, $x_{n-1}$ through $x_1$, where the function is expressed over a Galois Field of two elements (AND and XOR operations). The magnitude of the nonlinearity is the number of input variables in that product term which has the most input variables of all the terms in the function. The randomness properties normally of interest are the balance, run, span-n, linear span, and avalanche properties. See, Solomon W. Golomb, "On the Classification of Balanced Binary Sequences of Period $2^n-1$," IEEE Transactions on Information Theory, IT-26, No. 6, 1980, pp. 730–732. Two types of functions satisfying these criteria are the de Bruijn generators and substitution (S) boxes. See, Gregory L. Mayhew et al., "Characterization of Generators for Modified de Bruijn Sequences," Advances in Applied Mathematics, Volume 13, Number 4, 1992, pp. 454–461; and Mitthenthal, "A Source of Cryptographically Strong Permutations for Use in Block Ciphers," Proceedings of the 1993 IEEE International Symposium on Information Theory. These functions have T binary inputs so they require a ROM with $2^T$ states to implement their truth tables. In the exemplary systems 50, 100 and 150, order 6 functions were used. An example of an order 6 de Bruijn generator with a magnitude 4 nonlinearity is $X_6 \oplus X_2 \oplus X_1 \oplus X_5X_2 \oplus X_5X_1 \oplus X_4X_3 \oplus X_3X_1 \oplus X_2X_1 \oplus X_5X_3X_1 \oplus X_5X_2X_1 \oplus X_4X_3X_2 \oplus X_4X_2X_1 \oplus X_5X_4X_3X_1 \oplus X_5X_4X_2X_1$. The truth table for this generator function is 0111 0010 0110 1111 0000 0000 0000 1001 1000 1101 1001 0000 1111 1111 1111 0110, where the leftmost bit corresponds to the function value at state 0 and the rightmost bit corresponds to the function value at stage 63.

A particular design implementation has a working register length W, the order of the output functions T, and the magnitude of nonlinearity of the output functions. During the design process, the overall cryptographic strength of keystream can be increased by incorporating any of the following three features separately or in combination. First, the number of stages in the working register W can be increased beyond the minimum recommended amount. Second, the order T of the output functions can be increased. Third, for a given order T, functions which are more nonlinear but still satisfy the randomness criteria can be selected.

An unauthorized eavesdropper may attempt to analyze and compromise the security of a system by trying to estimate the algorithm used to produce keystream from samples of the keystream. An unauthorized eavesdropper may even have access to the encryption and decryption hardware or software. Thus, operationally the security of a system should ultimately only depend on the difficulty of determining the exact key sequence from all possible key sequences in the keyspace. For this reason, cryptographic keys should be changed often and this invention facilitates rapid operational changes of the contents of the key register. For added operational strength, the nonlinear output functions can also be changed. Depending on the selected implementation, the output functions can be changed by reprogramming the ROMs with new truth tables or by reconfiguring the discrete logic to perform the revised input to output mapping.

In the foregoing examples of encryption and decryption systems 100 and 150, the number of output functions N shown was 8. The value N can be any required value for a particular application. Values of 8, 16, and 32 are convenient values of N for digital communication and digital computer applications. Since each output function 80A–80N is driven by different stages of the working register 70, and since the output functions each contain different nonlinear sequences, multiple and mathematically independent key-stream bits are produced at each clock cycle.

The invention further includes a method for high speed encryption of digital data. The method includes the following steps:
providing a cryptographic key;
providing a working register comprising a linear feedback shift register having a plurality of stages including an output stage and a plurality of intermediate stages;
initializing the working register with a randomly or pseudorandomly generated binary sequence;
selectively feeding back the output state of the output stage into selected intermediate stages, as determined by the cryptographic key;
operating on the outputs of N sets of T stages of the working register with N respective nonlinear output functions to provide N output keystreams;
logically operating on the N bits of input data with the N output keystreams to provide encrypted data; and
clocking the working register stages at a selected rate, wherein the working register is advanced by one state, and N bits of input data are encrypted during each clock cycle.

Many variations on the exemplary embodiments described herein are possible. For example, a single nonlinear output function can be used to simplify the algorithm's implementation at the expense of reduced throughput, or many can be used to effectively multiply its throughput capability. Longer or shorter LFSRs than degree 61 can also be used, as well as higher or lower order de Bruijn sequences, or other suitably nonlinear functions with random properties, depending on the desired strength of the algorithm. The ROMs supplying the nonlinear sequences can also be replaced with discrete logic that performs the same input-output mapping to attain speeds beyond the access times of the fastest ROMs. This flexibility allows the algorithm to be easily tailored to meet a variety of system requirements. At the same time, the basic mathematical theories are retained to simplify the design process and proof of cryptographic suitability.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A high speed data encryption system for encrypting input data to produce encrypted data, comprising:
a working register, comprising a linear feedback shift register having a plurality of stages including an output stage and a plurality of intermediate stages;
means for initializing the working register by loading it with a binary sequence;
means for selectively feeding back the output state of said output stage of said working register into selected inputs of said intermediate stages, as determined by a cryptographic key;
N mathematical independent nonlinear output function means, where $N \geq 2$, each for performing a different nonlinear function on the output states of T selected stages of said working register, where $T \geq 1$;
means for clocking said working register, wherein with each clock cycle, said working register is advanced one state, and the outputs of said selected working register stages feed said N output function means; and
means for logically operating on respective input data bits and said outputs of said output function means to produce encrypted data.

2. The system of claim 1 wherein said N sets of T stages of said working register are randomly selected stages.

3. The system of claim 1 wherein said N output function means comprise N means programmed with nonlinear functions with random properties to map said respective working register stage outputs into N corresponding nonlinear outputs of said N output function means.

4. The system of claim 3 wherein said N means programmed with nonlinear functions comprises read only memory means having said nonlinear functions stored therein.

5. The system of claim 3 wherein said nonlinear functions comprise nonlinear de Bruijn sequences.

6. The system of claim 1 wherein said logical operating means comprises means for performing a logical XOR function.

7. The system of claim 6 wherein said means for performing a logical XOR function comprises a modulo-2 digital adder.

8. The system of claim 1 further comprising a key shift register comprising a plurality of cascaded register stages, and means for loading said key register with said cryptographic key.

9. The system of claim 1 wherein said binary sequence comprises a randomly generated binary sequence.

10. The system of claim 1 wherein said binary sequence comprises a pseudorandomly generated binary sequence.

11. A high speed data encryption system for encrypting input data to produce encrypted data, comprising:

a key shift register having a plurality of cascaded register stages;

means for loading said key register with a cryptographic binary data sequence;

a working register, comprising a linear feedback shift register having a plurality of stages including an output stage and a plurality of intermediate stages;

means for initializing the working register by loading it with a binary sequence;

means for selectively feeding back the output state of said output stage of said working register into selected inputs of said intermediate stages, as determined by the contents of said key register;

N mathematically independent nonlinear output function means for performing N different nonlinear functions on data input to said function means, where $N \geq 2$;

means for feeding the output states of N sets of T stages of said working register into respective inputs of said N output function means, where $T \geq 1$;

means for clocking said working register, wherein with each clock cycle, said working register is advanced one state, and said N sets of T working register stage outputs feed said N output function means; and means for performing a logical XOR function on respective input data bits and said outputs of said output function means to produce encrypted data.

12. The system of claim 11 wherein said N sets of T stages of said working register are randomly selected stages.

13. The system of claim 11 wherein said N output function means comprise N means programmed with nonlinear functions with random properties to map said respective working register stage outputs into N corresponding nonlinear outputs of said N output function means.

14. The system of claim 13 wherein said N means programmed with nonlinear functions comprises read only memory means having said nonlinear functions stored therein.

15. The system of claim 13 wherein said nonlinear functions comprise nonlinear de Bruijn sequences.

16. The system of claim 11 wherein said means for performing a logical XOR function comprises modulo-2 digital adder means.

17. The system of claim 11 wherein said working register has W stages, and said key register has W-1 stages to accommodate said working register.

18. The system of claim 11 wherein said means for selectively feeding back the output state of said output stage comprises:

a plurality of logical AND gate means, each gate means having a first input coupled to a corresponding output of a register stage of said key register and a second input coupled to the output of said output stage of said working register; and an XOR gate means disposed between each stage of said working register, one input of each said gate means coupled to the output of the preceding stage of said working register, and a second input of each said XOR gate means coupled to the output of a corresponding logical AND gate means, whereby the output of said output stage is selectively fed back into said intermediate stages of said working register in dependence on the respective states of said registers comprising said key register.

19. The system of claim 11 wherein said input data is arranged in 8-bit bytes, the number N of said output function means and said stages whose output states are fed into respective inputs of said output function means is eight, and said means for performing a logical XOR function comprises an 8-bit modulo-2 adder means.

20. The system of claim 11 wherein said means for initializing said working register comprises a multiplexer means having an output coupled to the input of a first of said stages of said working register, a first input connected to a source of said binary sequence, and a second input connected to the output of said working register output stage, said multiplexer providing a means for connecting said input stage of said working register to said source of said binary sequence during an initializing mode, and for connecting said output stage of said working register to said input stage during an encryption mode.

21. The system of claim 11 wherein said binary sequence comprises a randomly generated binary sequence.

22. The system of claim 11 wherein said binary sequence comprises a pseudorandomly generated binary sequence.

23. A method for high speed encryption of digital input data, comprising a sequence of the following steps:

providing a cryptographic key binary data sequence;

providing a working register comprising a linear feedback shift register having a plurality of stages including an output stage and a plurality of intermediate stages;

initializing the working register with a binary sequence;

selectively feeding back the output stage of said output stage into selected intermediate stages, as determined by said cryptographic key sequence;

operating on the outputs of N set of T stages of said working register with N respective mathematically independent nonlinear output functions to provide N output keystreams, where $N \geq 2$ and where $T \geq 1$;

logically operating on N bits of input data with N output keystreams to provide encrypted data; and clocking said working register stages at a selected clock rate, wherein said working register is advanced by one state, and N bits of input data are encrypted during each clock cycle.

24. The method of claim 23 wherein said N sets of T working register stages are selected randomly.

25. The method of claim 23 wherein said output functions have random properties.

26. The method of claim 25 wherein said output functions are determined by nonlinear de Bruijn sequences.

27. The method of claim 23 wherein said logical operating step includes the step of logically XORing input data bits with corresponding bits of said N output keystreams.

28. The method of claim 23 further comprising the steps of providing a key shift register comprising a plurality of cascaded register stages, filling the shift register stages with said key sequence, and using the states of the shift register stages to logically determine whether the state of the working register output stage is fed back into said intermediate stages.

29. The method of claim 23 wherein the number N is eight.

30. The method of claim 23 wherein said binary sequence comprises a randomly generated binary sequence.

31. The method of claim 23 wherein said binary sequence comprises a pseudorandomly generated binary sequence.

32. A high speed data decryption system for decrypting input ciphertext data to produce decrypted data, comprising:
   a working register, comprising a linear feedback shift register having a plurality of stages including an output stage and a plurality of intermediate stages;
   means for initializing the working register by loading it with a binary sequence;
   means for selectively feeding back the output state of said output stage of said working register into selected inputs of said intermediate stages, as determined by a cryptographic key;
   wherein said binary sequence and said cryptographic key corresponds to a respective binary sequence and a cryptographic key used to encrypt said ciphertext;
   N mathematically independent nonlinear output function means, where $N \geq 2$, each for performing a different nonlinear function on the output states of T selected stages of said working register, where $T \geq 1$;
   means for clocking said working register, wherein with each clock cycle, said working register is advanced one state, and the outputs of said selected working register stages feed said N output function means; and
   means for logically operating on respective input data bits and said outputs of said output function means to produce decrypted data from said ciphertext.

33. The system of claim 32 wherein said N sets of T stages of said working register are randomly selected stages.

34. The system of claim 32 wherein said N output function means comprise N means programmed with nonlinear functions with random properties to map said respective working register stage outputs into N corresponding nonlinear outputs of said N output function means.

35. The system of claim 34 wherein said N means programmed with nonlinear functions comprises read only memory means having said nonlinear functions stored therein.

36. The system of claim 34 wherein said nonlinear functions comprise nonlinear de Bruijn sequences.

37. The system of claim 32 wherein said logical operating comprises means for performing a logical XOR function.

38. The system of claim 37 wherein said means for performing a logical XOR function comprises a modulo-2 digital adder.

39. The system of claim 32 further comprising a key shift register comprising a plurality of cascaded register stages, and means for loading said key register with said cryptographic key.

40. The system of claim 32 wherein said binary sequence comprises a randomly generated binary sequence.

41. The system of claim 32 wherein said binary sequence comprises a pseudorandomly generated binary sequence.

42. A method for high speed decryption of digital input ciphertext data, comprising a sequence of the following steps:
   providing a cryptographic key binary data sequence corresponding to a cryptographic key sequence used to generate said ciphertext data;
   providing a working register comprising a linear feedback shift register having a plurality of stages including an output stage and a plurality of intermediate stages;
   initializing the working register with a binary sequence, said binary sequence corresponding to a binary sequence used to generate said ciphertext data;
   selectively feeding back the output state of said output stage into selected intermediate stages, as determined by said cryptographic key sequence;
   operating on the outputs of N set of T stages of said working register with N respective mathematically independent nonlinear output functions to provide N output keystreams, where $N \geq 2$ and where $T \geq 1$;
   logically operating on said N bits of input data with N output keystreams to provide decrypted data; and
   clocking said working register stages at a selected clock rate, wherein said working register is advanced by one state, and N bits of input data are decrypted during each clock cycle.

43. The method of claim 42 wherein said N sets of T working register stages are selected randomly.

44. The method of claim 42 wherein said output functions have random properties.

45. The method of claim 42 wherein said output functions are determined by nonlinear de Bruijn sequences.

46. The method of claim 42 wherein said logical operating step includes the step of logically XORing input data bits with corresponding bits of said N output keystreams.

47. The method of claim 42 further comprising the steps of providing a key shift register comprising a plurality of cascaded register stages, filling the shift register stages with said key sequence, and using the states of the shift register stages to logically determine whether the state of the working register output state is fed back into said intermediate stages.

48. The method of claim 42 wherein said binary sequence comprises a randomly generated binary sequence.

49. The method of claim 42 wherein said binary sequence comprises a pseudorandomly generated binary sequence.

* * * * *